United States Patent
Hissel (10) Patent No.: US 12,506,429 B2
(45) Date of Patent: Dec. 23, 2025

(54) SYSTEMS AND METHODS FOR AN ADAPTIVE POWER SYSTEM STABILIZER (PSS)

(71) Applicant: General Electric Company, Schenectady, NY (US)

(72) Inventor: Anne-Marie Hissel, Ronchamp (FR)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 478 days.

(21) Appl. No.: 18/077,174

(22) Filed: Dec. 7, 2022

(65) Prior Publication Data
US 2024/0146221 A1    May 2, 2024

(30) Foreign Application Priority Data
Oct. 26, 2022   (FR) ...................................... 2211106

(51) Int. Cl.
| | |
|---|---|
| *H02P 9/04* | (2006.01) |
| *G05B 17/02* | (2006.01) |
| *H02P 9/10* | (2006.01) |
| *H02J 3/38* | (2006.01) |

(52) U.S. Cl.
CPC .............. *H02P 9/105* (2013.01); *G05B 17/02* (2013.01); *H02J 3/381* (2013.01); *H02P 9/04* (2013.01)

(58) Field of Classification Search
None
See application file for complete search history.

(56) References Cited

U.S. PATENT DOCUMENTS

| | | |
|---|---|---|
| 5,300,876 A | 4/1994 | Takagi |
| 5,698,968 A | 12/1997 | Takagi et al. |
| 5,977,731 A * | 11/1999 | Xia .................. H02P 9/105 318/147 |
| 6,625,520 B1 | 9/2003 | Chen et al. |
| 7,912,589 B2 | 3/2011 | Korba et al. |

(Continued)

FOREIGN PATENT DOCUMENTS

| | | | |
|---|---|---|---|
| CH | 694113 A5 | 7/2004 | |
| CN | 101009150 A * | 8/2007 | ............... H01C 1/16 |

(Continued)

OTHER PUBLICATIONS

Khujaev et al., "Stability enhancement of power system with the implementation of power system stabilizer PSS and excitation system", 2021, IEEE 15th International Engineering and Computing Research Conference (EURECA 2021) (Year: 2021).*

(Continued)

*Primary Examiner* — Mohammad Ali
*Assistant Examiner* — Kelvin Booker
(74) *Attorney, Agent, or Firm* — Fletcher Yoder, P.C.

(57) ABSTRACT

A power generation system includes an adaptive power system stabilizer (PSS). The adaptive PSS includes a first estimator configured to receive a plurality of sensor measurements as input and to output a derived infinite bus (IB) value. The adaptive PSS further includes a second estimator disposed downstream of the first estimator and configured to receive the derived IB value as input and to output a derived electric generator parameter, wherein the adaptive PSS is configured to use the derived electric generator parameter to provide stabilization of an electric generator.

20 Claims, 4 Drawing Sheets

(56) References Cited

U.S. PATENT DOCUMENTS

| | | | |
|---|---|---|---|
| 8,977,402 B2 | 3/2015 | Garcia | |
| 9,515,593 B2* | 12/2016 | Hissel | G05B 17/02 |
| 9,529,346 B2* | 12/2016 | Hissel | G05B 13/042 |
| 10,103,666 B1 | 10/2018 | Fan et al. | |
| 10,975,847 B1* | 4/2021 | Schulten | H02J 3/241 |
| 11,139,764 B2* | 10/2021 | Desabhatla | H02P 9/105 |
| 2005/0137834 A1* | 6/2005 | Heydt | G06F 30/367 |
| | | | 703/2 |
| 2011/0137474 A1* | 6/2011 | Larsen | F03D 7/0284 |
| | | | 290/44 |
| 2011/0291413 A1* | 12/2011 | Wamble, III | F03D 9/25 |
| | | | 290/55 |
| 2014/0132227 A1* | 5/2014 | Hissel | G05B 17/02 |
| | | | 322/28 |
| 2014/0136003 A1* | 5/2014 | Hissel | G05B 13/042 |
| | | | 700/287 |
| 2014/0152010 A1* | 6/2014 | Larsen | F03D 7/00 |
| | | | 290/44 |
| 2015/0219075 A1* | 8/2015 | Cardinal | F03D 7/048 |
| | | | 290/44 |
| 2016/0084919 A1 | 3/2016 | Gokaraju et al. | |
| 2017/0009743 A1* | 1/2017 | Brogan | F03D 7/042 |
| 2017/0009744 A1* | 1/2017 | Brogan | H02J 3/36 |
| 2017/0009745 A1* | 1/2017 | Brogan | G05F 1/12 |
| 2018/0198394 A1* | 7/2018 | Desabhatla | H02P 9/102 |
| 2020/0379424 A1 | 12/2020 | Wang et al. | |

FOREIGN PATENT DOCUMENTS

| | | | | |
|---|---|---|---|---|
| CN | 109861294 A | * | 6/2019 | H02J 3/38 |
| CN | 110739721 A | * | 1/2020 | H02J 3/38 |
| CN | 114513008 A | * | 5/2022 | H02J 3/388 |
| EP | 713287 A1 | * | 11/1995 | H02P 9/10 |
| EP | 1489714 A1 | | 12/2004 | |
| EP | 4007106 A1 | | 6/2022 | |
| EP | 4012172 A1 | | 6/2022 | |
| JP | 2001339861 A | | 12/2001 | |
| JP | 3862970 B2 | | 12/2006 | |
| JP | 2011115003 A | | 6/2011 | |
| JP | 2014171325 A | | 9/2014 | |
| JP | 2017060355 A | | 3/2017 | |
| JP | 2019118182 A | | 7/2019 | |
| JP | 2019201454 A | | 11/2019 | |
| JP | 7010690 B2 | | 1/2022 | |
| KR | 20070037166 A | | 4/2007 | |
| WO | WO-2019130665 A1 | * | 7/2019 | H02J 3/50 |

OTHER PUBLICATIONS

Jamsheed et al., "Design of an Adaptive Power System Stabilizer using Robust System-Response Prediction", 2020 IEEE International Conference on Power Electronics, Smart Grid and Renewable Energy (PESGRE2020), (Year: 2020).*

Shama, F., "Adaptive Power System Stabilizer Design For Interconnected Power Systems", 2018 Smart Grid Conference (SGC). (Year: 2018).*

Zhang et al., "An Artificial Neural Network Based Adaptive Power System Stabilizer", 1992, IEEE Transactions on Energy Conversion, vol. 8, No. 1. (Year: 1992).*

Shamsollahi et al., "An Adaptive Power System Stabilizer Using On-Line Trained Neural Networks", Jul. 1996, IEEE Transactions on Energy Conversion, vol. 12, No. 4. (Year: 1996).*

He et al., "An Adaptive Power System Stabilizer Based on Recurrent Neural Networks", Aug. 1996, IEEE Transactions on Energy Conversion, vol. 12, No. 4. (Year: 1996).*

Hemmati, R., "Power system stabilizer design based on optimal model reference adaptive system", Oct. 2015, Ain Shams Engineering Journal (2018) 9, 311-318. (Year: 2015).*

Alsakati et al., "Transient Stability Improvement of Power System using Power System Stabilizer Integrated with Excitation System", Aug. 2021, 11th IEEE International Conference on Control System, Computing and Engineering (ICCSCE 2021). (Year: 2021).*

PCT International Search Report and Written Opinion; Application No. PCT/US2023/077421; dated Feb. 27, 2024; 10 pages.

French Preliminary Search Report & Written Opinion for FR Application No. 2211106 dated Apr. 28, 2023, 7 pgs.

H. Tanaka, et al., "An Equivalent of Multi-Machine Power Systems and Its Identification for On-Line Application to Decentrarized Stabilizers", IEEE Transactions on Power Systems, vol. 4, No. 2, May 1989, 7 pgs.

* cited by examiner

SYSTEMS AND METHODS FOR AN ADAPTIVE POWER SYSTEM STABILIZER (PSS)

CROSS-REFERENCE TO RELATED APPLICATION

This application claims priority to and benefit of French Application No. 2211106, filed on Oct. 26, 2022; entitled "SYSTEMS AND METHODS FOR AN ADAPTIVE POWER SYSTEM STABILIZER (PSS)", which is herein incorporated by reference in its entirety.

BACKGROUND

The subject matter disclosed herein relates to power system stabilizers, and more specifically, to an adaptive power system stabilizer.

Certain power production systems may include generators and distributed generators that may be powered by turbine systems, such as, but not limited to, gas turbine systems. The gas turbine systems may, for example, provide motive power suitable for rotating the generators and thus producing electrical power. The turbine systems and generator systems may include one or more controllers suitable for providing a variety of control functions, such as the control of turbine speed, load, generator voltage, reactive power flow, and the overall stability of the power production system. During operations, the power production system may be electrically coupled to a power grid, such as a city or municipal power grid. However, under certain operating conditions of the power grid, transient conditions may occur. It would be beneficial to improve the handling of the transient conditions via a power system stabilizer (PSS).

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a power generation system includes an adaptive power system stabilizer (PSS). The adaptive PSS includes a first estimator configured to receive a plurality of sensor measurements as input and to output a derived infinite bus (TB) value. The adaptive PSS further includes a second estimator disposed downstream of the first estimator and configured to receive the derived IB value as input and to output a derived electric generator parameter, wherein the adaptive PSS is configured to use the derived electric generator parameter to provide stabilization of an electric generator.

In a second embodiment, a method includes procuring, via a sensor network, a plurality of sensor measurements, and deriving, via a first estimator, an infinite bus (TB) value; wherein the first estimator is configured to use the plurality of sensor measurements as input to output the IB value. The method further includes deriving, via a second estimator disposed downstream of the first estimator, a derived electric generator parameter, wherein the second estimator is configured to use the IB value and the plurality of sensor measurements as inputs to output the derived electric generator parameter. The method also includes stabilizing an electric generator via an adaptive power system stabilizer (PSS) based on the derived electric generator parameter.

In a third embodiment, a non-transitory computer-readable medium having computer executable code stored thereon, the code includes instructions to procure, via a sensor network, a plurality of sensor measurements, and to derive, via a first estimator, an infinite bus (TB) value; wherein the first estimator is configured to use the plurality of sensor measurements as input to output the IB value. The code also includes instructions to derive, via a second estimator disposed downstream of the first estimator, a derived electric generator parameter, wherein the second estimator is configured to use the IB value as input to output the derived electric generator parameter. The code further includes instructions to stabilize an electric generator via an adaptive power system stabilizer (PSS) based on the derived electric generator parameter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the invention, the articles "a," "an," "the," and "said" are intended to mean that there are one or more of the elements. The terms "comprising," "including," and "having" are intended to be inclusive and mean that there may be additional elements other than the listed elements.

Present embodiments relate to systems and methods for power system stabilization of a generator that may be connected to a prime mover, such as, but not limited to, a gas turbine system, a steam turbine system, a hydro turbine system, a wind turbine system, a nuclear turbine system, or any combination thereof. Particularly, an adaptive power system stabilizer (PSS) system is provided to continuously and adaptively determine applying PSS settings values to dampen one of more of a variety of oscillation frequency ranges (e.g., inter-tie frequency range, local frequency range, intra-plant frequency range, and so forth) based upon cascaded models (e.g., cascaded models). For example, electricity generation due to renewable energy sources (e.g., wind, solar, and the like) can cause frequency changes in the grid (e.g., transient conditions). Thus, when sources of transient conditions cause particular transient changes (e.g., above or below a threshold value), less synchronous inertia may be present and an increased rate of change of frequency conditions may result in a power production system reaction. Likewise, the power grid may become more dynamic by using certain renewable energy technologies (e.g., solar power plants, wind power plants, hydroelectric power plants) that may vary power production during operations due to cloud patterns, wind conditions, rain, and so on.

The techniques described herein include the use of a cascade set of estimators, where a first estimator in the cascaded set may now derive an infinite bus value, such as a voltage value for the infinite bus, as well as an external reactance. Indeed, rather than treat the infinite bus as a constant, the first estimator may now account for variations in the infinite bus, for example, caused by renewable energy power production systems. The derived infinite bus values may then be used as input into a second estimator downstream from the first estimator. The second switchable estimator may model details of machinery (e.g., generator) as well as use certain internal variables or parameters of the first estimator. The second estimator may include switching logic to switch between various models, as further described below. Outputs of the second estimator may then be used by the adaptive PSS to improve power generation, for example, by adjusting certain signals sent to an automatic voltage regulator (AVR) useful in dampening or eliminating system oscillations via the AVR. Accordingly, the techniques described herein may provide for enhanced stability and improved power outputs even with renewable energy sources connected to the power grid.

As used herein, "power system stability" may refer at least to the ability of a power system and associated components (e.g., grid, generators, turbines, and so forth) to transition from, for example, a steady-state operating point (e.g., nominal operating point) to, for example, one or more other operating points (e.g., transient and/or dynamic operating points) following a perturbation, a disturbance, or other undesired impact to the power system. Furthermore, as used herein, "damp," "damping," and/or "damped oscillation" may refer to an act or result of a decreasing of amplitude of an oscillation with time. Similarly, "new operating parameter," "new state," or "new operating condition" may refer to the operating point and/or operating conditions the power system and associated components (e.g., grid, generators, turbines, and so forth) may periodically and/or aperiodically transition to during operation following, for example, the perturbation, the disturbance, or other undesired impact to the power system.

Figure 1:
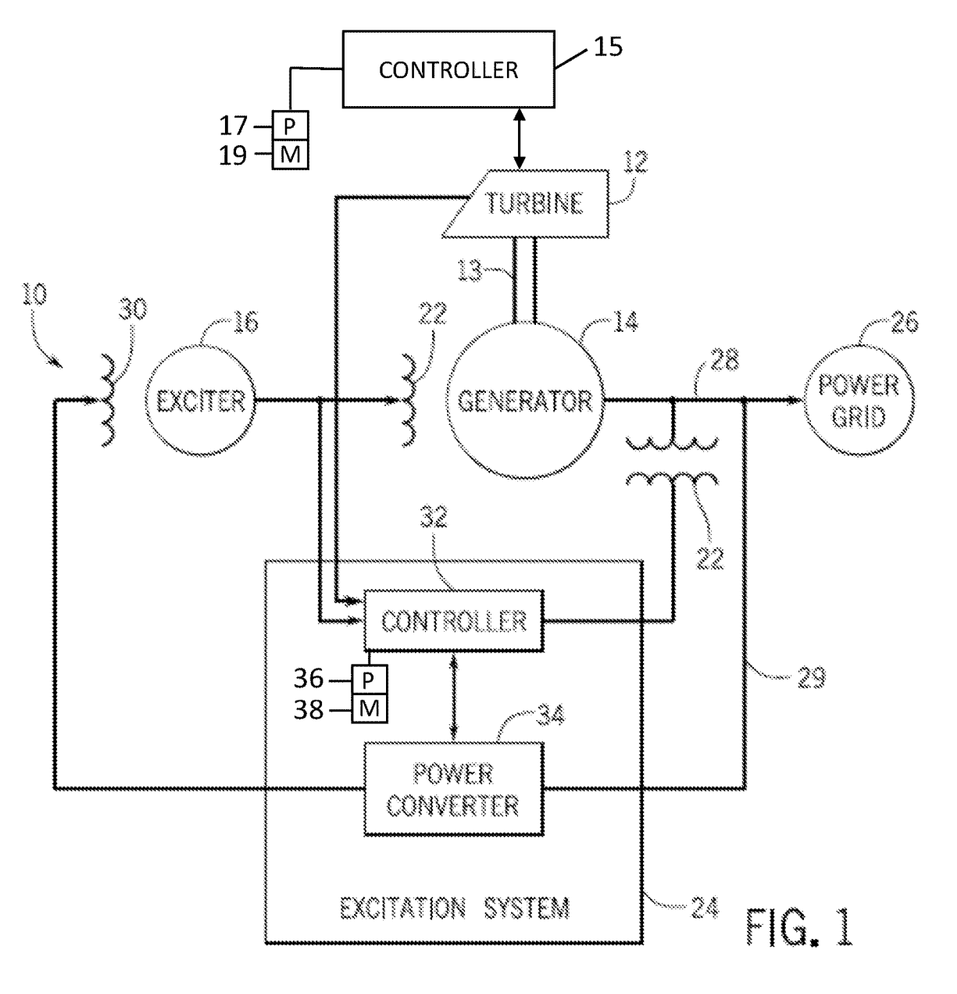
FIG. 1 is a block diagram of an embodiment of a power production system having an adaptive power system stabilizer.

With the foregoing in mind, it may be useful to describe an embodiment of a power generation system, such as an example power generation system 10 illustrated in FIG. 1. The power generation system 10 may include various subsystems such as a turbine 12, a generator 14, and an exciter 16. The turbine 12 (e.g., gas turbine, steam turbine, hydro turbine, and the like) may be coupled the generator 14 via a shaft 13 and controlled via a turbine controller 15. The generator 14 may be in turn communicatively coupled to the generator exciter 16. The exciter 16 may provide a direct current (DC) to field windings 22 of the generator 14. Particularly, the exciter 16 may provide a DC field current (e.g., the current utilized by the field windings 22 of the generator 14 and/or other synchronous machine to establish a magnetic field for operation) to excite the magnetic field of the generator 14. For example, the exciter 16 may be a static (e.g., power electronic) or rotating (e.g., brush and/or brushless) exciter. In other embodiments, the exciter 16 may be bypassed, and a power output may directly energize the field windings 22 of the generator 14. As also depicted, the output terminals of the generator 14 may be coupled to a large scale utility power grid 26 via alternating current (AC) lines 28. Alternatively, the output terminals of the generator 14 may be coupled to a small industrial power generation plant.

The power generation system 10 may also include an excitation system 24, which may provide various control parameters to each of the generator 14 and/or the exciter 16 for example, based on measured parameters and/or indications of measured parameters received at one or more inputs to the excitation system 24. In certain embodiments, the excitation system 24 may function as an excitation control for the generator 14 and the exciter 16. The excitation system 24 may include one or more controllers 32 and one or more power converters 34. As generally illustrated, the controller(s) 32 may include one or more processors 36 and a memory 38, which may be used collectively to support an operating system, software applications and systems, and so forth, useful in implementing the techniques described herein.

The power converter 34 may include a subsystem of integrated power electronic switching devices such as silicon-controlled rectifiers (SCRs), thyristors, insulated gate bipolar transistors (IGBTs), and so forth, that receive alternating current (AC) power, DC power, or a combination thereof from a source such as, for example, the power grid 26. The excitation system 24 may receive this power via a bus 29, and may provide power, control, and monitoring to the field windings 30 of the exciter 16 based thereon. Thus, the excitation system 24 and the exciter 16 may operate collectively to drive the generator 14 in accordance with a desired output (e.g., grid voltage, power factor, loading frequency, torque, speed, acceleration, and so forth). As an example, in one embodiment, the excitation system 24 may be an excitation controller system, such as the EX2100e™ excitation control regulator system, available from General Electric Co. of Schenectady, New York.

In certain embodiments, the power grid 26, and by extension, the turbine 12 and the generator 14 may be susceptible to certain disturbances due to, for example, transient loss of power generation by the generator 14, power line 28 switching, load changes on the power grid 26, electrical faults on the power grid 26, and so forth. Such disturbances may cause the operating frequencies (e.g., approximately 50 Hz for most countries of Europe and Asia and approximately 60 Hz for countries of North America) of the turbine 12 and/or the generator 14 to experience undesirable oscillations that may lead to system 10 transient and/or dynamic instability. Such transient and/or dynamic instability may cause the generator 14, as well as the turbine 12 and exciter 16, to transition from a steady-state operating point to a transient and/or dynamic operating point. Specifically, frequency deviations on the power grid 26 may cause generator 14 rotor angle swings (e.g., power angle oscillations) throughout the power system 10. Moreover, because conventional power system stabilizer (CPSS) systems (e.g., systems used to damp the generator 14 rotor angle oscillations) may be generally configured according to linear, fixed parameters, the CPSS systems, unlike the adaptive PSS techniques described herein, may not damp the generator 14 rotor angle oscillations effectively over the entire dynamic operating range of the generator 14, as desired.

As will be discussed in further detail below, in certain embodiments, the controller 32 of the excitation system 24 may include an adaptive power system stabilizer (PSS) system (shown in FIG. 2) that may be implemented as part of the excitation system 24 to dynamically and adaptively regulate (e.g., dynamically and adaptively damp) frequency oscillations of, for example, the rotor of the generator 14, and thus enhance the ability of the system 10 to seamlessly move to the transient and/or dynamic operating point or to substantially return to the steady-state operating point, or to survive the transition to a new steady-state operating point (e.g., derived by the adaptive PSS system) and to maintain stable operation at the new steady-state operating point. The adaptive PSS system may be coupled with an automatic voltage regulator (AVR) and use the AVR, for example, to dampen certain oscillations, and further described below.

Figure 2:
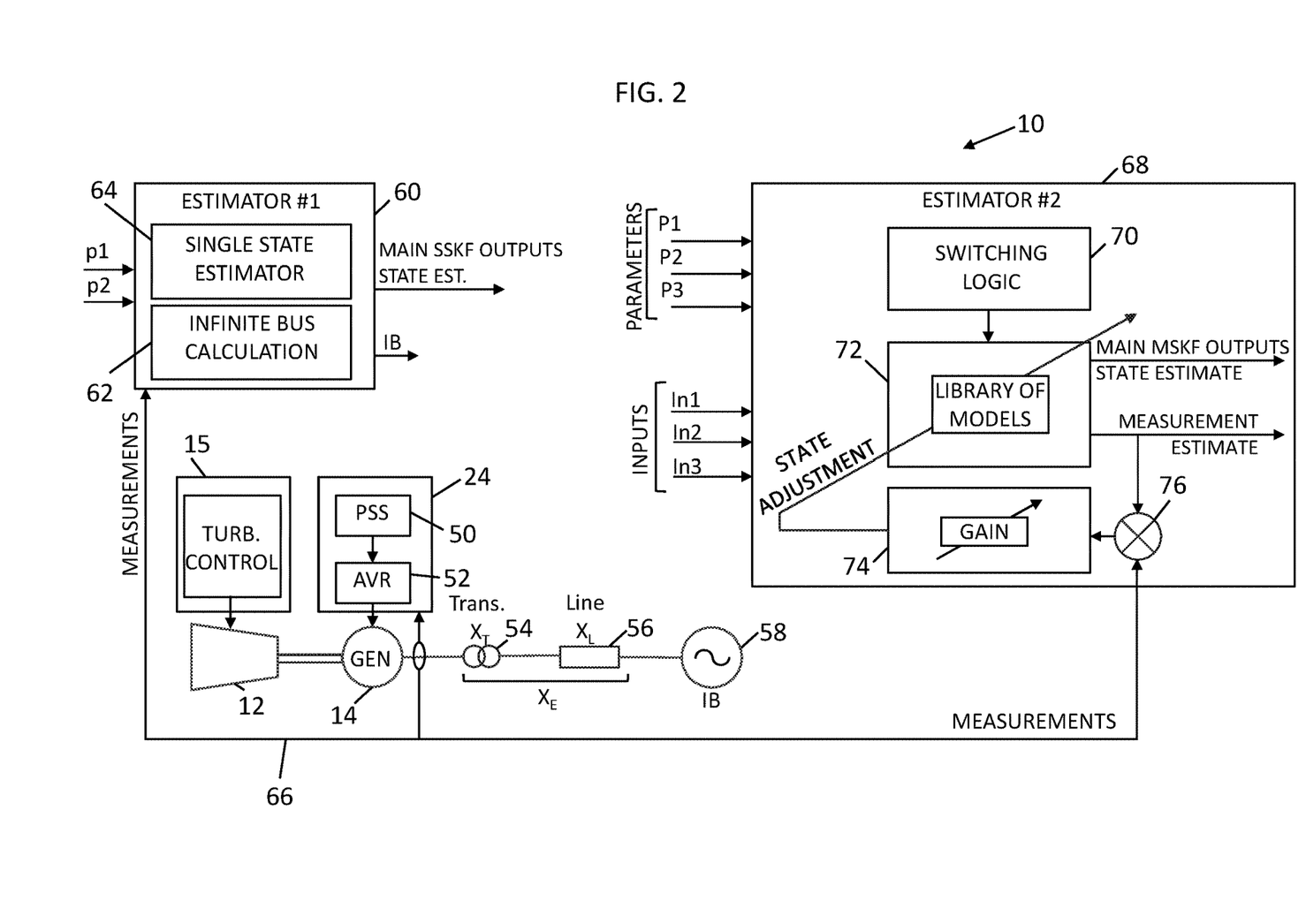
FIG. 2 is a block diagram illustrating an embodiment of a first estimator which may be coupled may to a second estimator, wherein the first and/or the second estimator may be included in the adaptive power system stabilizer of FIG. 1.

FIG. 2 is a block diagram of an embodiment of the excitation system 24. More specifically, the excitation system 24 is shown as including an adaptive power system stabilizer (PSS) system 50 and an automatic voltage regulator (AVR) 52. As mentioned earlier, the turbine 12 controlled by the turbine controller 15 may produce a mechanical power (Pmec) and used to rotatively turn a rotor included in the generator 14. As generally illustrated, the controller(s) 15 may include one or more processors 17 and a memory 19, which may be used collectively to support an operating system, software applications and systems, and so forth, useful in implementing the techniques described herein. Rotation of the rotor in a magnetic field may produce electrical power, which may then be transmitted through a transformer ($X_T$) 54 and lines ($X_L$) 56. An infinite bus 58 is also shown.

The infinite bus 58 is traditionally described as a bus whose frequency and voltage remain constant regardless of an amount of load on the infinite bus. For example, a very large number of generators 14 (e.g., synchronous machines) may be connected to a bus so that the bus is said to have infinite active and reactive power. Thus, electrical devices connected to the infinite bus typically will not affect other electrical devices when turned on or off. However, as more and more renewable energy sources (e.g., solar panels, wind turbines, hydro turbines, and the like) are added to the infinite bus, large energy sources (e.g., 1 kW and above) may perturb other devices, e.g., the generator 14, now coming online and offline. Accordingly, the techniques described herein model the infinite bus, e.g., via estimators, to behave as if there may be actual voltage and/or frequency fluctuations.

In the depicted embodiment, a first estimator 60 may now include an infinite bus calculation system 62 and a single state estimator 64. The estimator 64 may include, but is not limited to, a Kalman filter type estimator. Inputs to the first estimator 60 may include measurements taken through a sensor network 66. The sensor network 66 may sense generator 14 properties such as voltage, amperage, active power, reactive power, slip, frequency, phase angle, noise, and so on. The measurements from the sensor network 66 may be provide to the estimator 60 and to a second, cascaded estimator 68, as inputs.

The first estimator 60 may use the single state Estimator 64 to provide as output (e.g., state estimate) an external reactance $X_E$. The infinite bus calculation system 62 may then provide a derived infinite bus value, such as an infinite bus voltage and/or frequency. In the depicted embodiment, the single state Estimator 64 may use certain model parameters such as a process noise covariance (qEK) representative on un uncertainty in the calculations of the process, a sensor noise covariance (rEK) representative of noise in sensors (e.g., the sensor network 66).

The single state estimator 64 may use as input a generator stator current Ist, a generator stator voltage Ust, and a phase angle φ, i.e., the angle between stator voltage and stator current, in a relationship $Ist^2 \cdot X_E^2 + 2 \cdot Ust \cdot Ist \cdot \sin\varphi \cdot X_E + Ust^2 - IB^2 = 0$ where $X_E$ is the external reactance to provide as output and IB is the infinite bus voltage to derive $X_E$. Measurements for Ist, Ust, and φ may be provided by the sensor network 66 and IB may be computed by the system 62. Any type of single state estimator may be used, including but not limited to, the traditional Kalman-Bucy filter, e.g., linear quadratic estimator or other type of estimator suitable for using the relationship $Ist^2 \cdot X_E^2 + 2 \cdot Ust \cdot Ist \cdot \sin\varphi \cdot X_E + Ust^2 - IB^2 = 0$ to solve for $X_E$ based on values, including historic values, for the remaining terms.

The second estimator 68 may use as inputs a mechanical power (Pmec) that may be provided by the turbine controller 15, a generator field voltage (Efd) that may be provided by the excitation system 24, and the IB voltage that may be derived via the infinite bus calculation system 62. The second estimator 68 may use certain model parameters such as a process noise covariance ($Q_{EK}$) representative on un uncertainty in the calculations of the process, a sensor noise covariance ($R_{EK}$) representative of noise in sensors (e.g., the sensor network 66).

The second estimator 68 may estimate certain generator 14 (e.g., synchronous machine) internal states, such as δ, an angle between a generator electromagnetic field (EMF) and a reference voltage vector; ω, generator 14 speed (e.g., RPM); E', generator 14 internal voltage; and ψk, flux in the generator 14. The second estimator 68 may additionally estimate external reactance $X_E$, and some parameters of the machine model itself, as further described below. Indeed, the second estimator 68 may model or otherwise include model parameters in addition to machine parameters. The second estimator 68 may include a switching logic 70 that may be used, for example, to switch between certain estimator models as further described below.

An Extended model 72 is also shown, which may provide as output certain generator 14 states, a derivation of the external reactance $X_E$, and some generator 14 parameters. The Extended model 72 may also output measurement estimates for power (active and reactive power), current components, and/or voltage components. The Extended model 72 may be a multi-state Kalman filter that embeds a model of the generator 14 connected to the infinite bus 58 as follows:

$$X[k+1] = f\text{State}(X[k], u[k]) + \omega[k] \qquad \text{Equation 1:}$$

$$Z[k+1] = h\text{Measure}(X[k+1], u[k]) + v[k] \qquad \text{Equation 2:}$$

With u=[Efd; Pmec; IB]$^T$, ω is the process (model) noise and v is the measure noise. X[k], represents the state of the system at time step k as a linear combination of the state at the previous time step X[k−1], while Z[k] represents the system measurements at time step k. While an Extended Kalman filter is described via Equation 1 and 2, it is to be understood that other estimators may be created that use u=[Efd; Pmec; IB]$^T$ to model future states k, e.g., k+1.

In the depicted embodiment, the Extended model is adjustably coupled to a gain system 74. In use, the gain system 75 may compare (e.g., via comparator 76) measurements incoming from the sensor network 66 to the measurements predicted by the Extended model 72 and adjust a gain to minimize or eliminate the differences. The gain may be a constant (e.g., positive or negative number), an equations, or a combination thereof. The first estimator 60 and/or the second estimator 68 may be included in the excitation system 24, or may be communicatively and/or operatively coupled with the excitation system 24. The first estimator 60 and/or the second estimator 68 may be provided as software, hardware, or a combination thereof. When implemented as software, the first estimator 60 and/or the second estimator 68 may be executable via the processor(s) 36 and stored in the memory 38.

Outputs of the second estimator 68, such as certain generator 14 (e.g., synchronous machine) internal states, such as δ, an angle between EMF and the reference voltage vector; co, generator 14 speed (e.g., RPM); E', generator 14 internal voltage; and ok, flux in the generator 14; external reactance $X_E$; power in watts for the generator 14; current of the generator 14; and/or voltage of the generator 14, may then be used by the adaptive PSS 50, for example, to stabilize the generator 14. For example, the adaptive PSS 50 may use the AVR 52 to inject voltages, current, and so forth, based on the outputs of the second estimator 68. In this manner, a more efficient and adaptive power generation system 10 may be provided.

Figure 3:
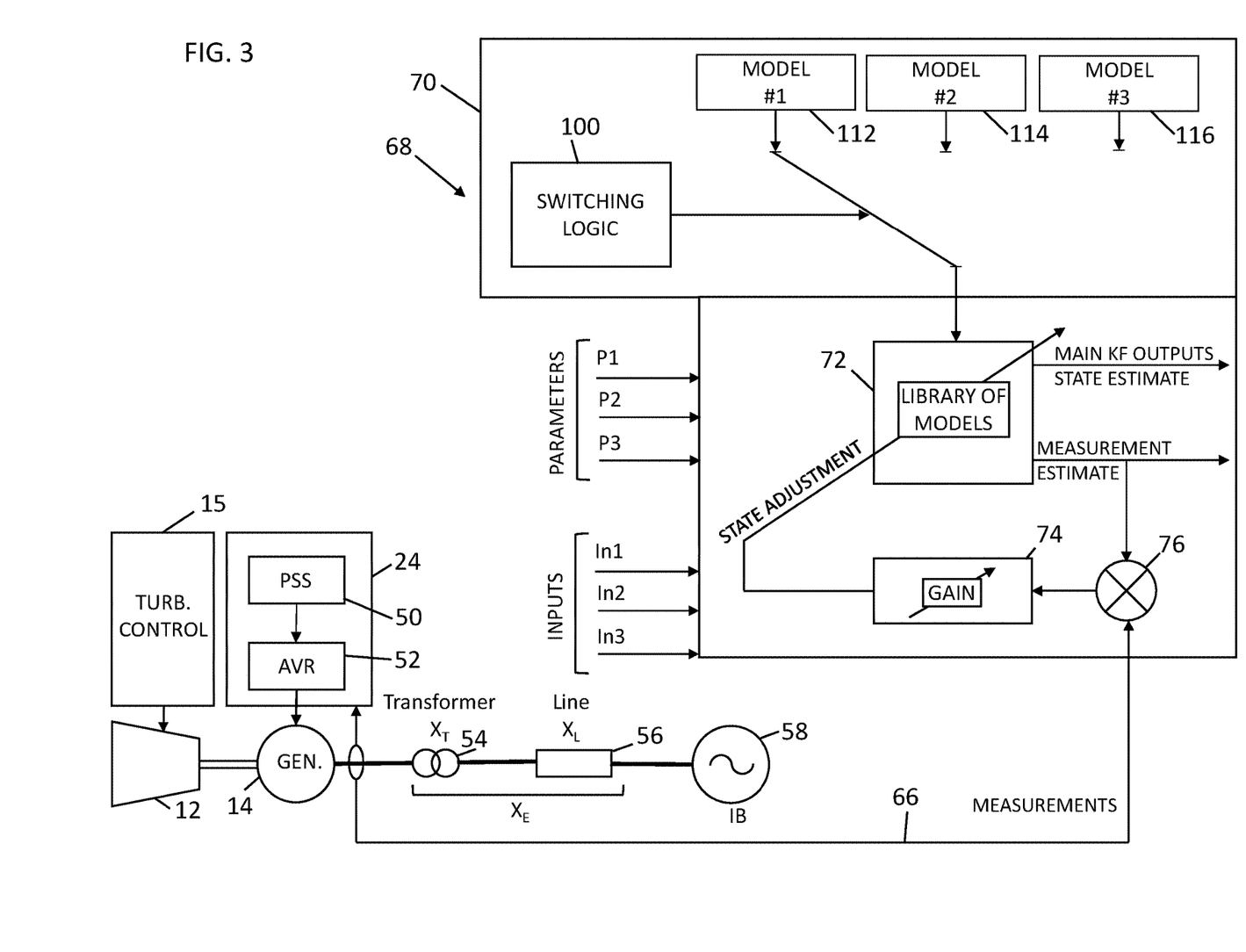
FIG. 3 is a block diagram showing further details of an embodiment of the second estimator having switchable models.

FIG. 3 is a block diagram of an embodiment of the second estimator 68 that includes the switching logic 70 switchable via a switching logic trigger 100. Because the figure includes some elements of FIG. 2, the same elements use the same numbers. In the illustrated embodiment, the second estimator 68 may include multiple switchable models, such as models 112, 114, and 116. As operations of the power generation system 10 begin, the first model 112 may be used. The first model 112 may embed a model of the generator 14, as mentioned above. For example, the first model 112 may include Equations 1 and 2 described above, with u=[Efd; Pmec; IB]$^T$, ω is the process (model) noise and v is the measure noise. The second model 114 may include all of the first model 112 and add one more state variable SV1. SV1 may be, for example, the external reactance of the electrical network $X_E$. Similarly, the third model 116 may include all of the second model 114, including state variable SV1, and add another state variable SV2. SV2 may be, for example, a parameter of the extended model of second estimator 68 becoming a variable such as for example a synchronous reactance.

Indeed, one or more of the switchable models may include any variable of the Extended model 72. The use of internal variables of the Extended model 72 in one or more of the switchable models of the estimator 68 may result in adjustments to the Extended model 72 in the estimator 68, improving predictive capabilities of the outputs of the estimator 68. It is to be understood that more than three switchable models may be used. Indeed, 4, 5, 6, 7, 8 or more switchable models may be used to improve estimation. State variables (SVs) that may be used by the models include the external reactance of the electrical network $X_E$, any variables of the first estimator 60, any parameter of the Extended model 72, and so on.

The switching logic trigger 100 may switch from one model to the next model (e.g., from the first model 112 to the second model 114, then from the second model 114 to the third model 116, and so on) by using time, by applying an error threshold, or a combination thereof. When using time, the switch from one model to the next may happen at a regular interval, such as between 0.1 to 30 seconds, between 0.5 to 5 hours, and so on. When using an error threshold, and error may be calculated, e.g., via the comparator 76, or using other comparison. For example, the switching logic trigger 100 may compare the external reactance $X_E$ calculated by the first estimator 60 with the external reactance $X_E$ calculated by the second estimator 68, and if the comparison is lower than a desired amount, then the switching to the next model may occur. By applying a switching logic to select a more complex model, the techniques describe herein may enable more accurate derivations by the second estimator 68.

Figure 4:
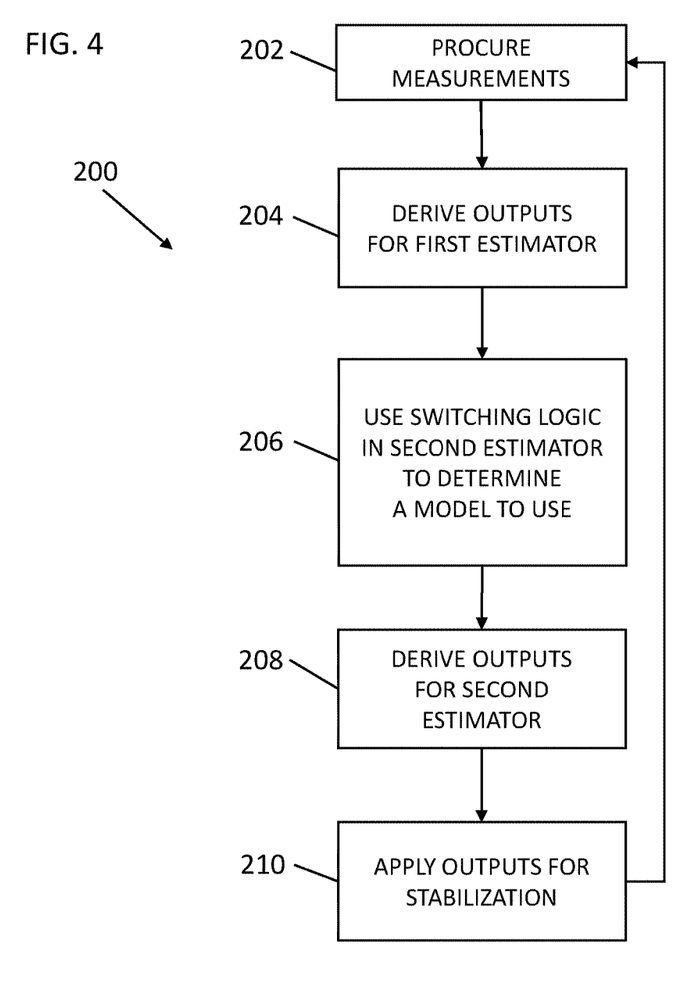
FIG. 4 is a flowchart illustrating an embodiment of a process suitable for applying the adaptive power system stabilizer of FIG. 1.

FIG. 4 is a flowchart of an embodiment of a process 200 suitable for adjusting parameters of the adaptive PSS 50 via cascaded estimators 60 and 68. The process 200 may be stored as computer instructions in the memory 38 and be executed by the processor(s) 36. In the depicted embodiment, the process 200 may procure (block 202) measurements via the sensor network 66. For example, the sensor network 66 may include one or more sensors, such as voltage sensors, electrical current sensors, inductance sensors, capacitance sensors, magnetic flux sensors, and the like, disposed in the generator 14, in the transformer 54, on the line 56, and/or in the turbine system 12.

The process 200 may then derive (block 204) certain outputs via the first estimator 60. As mentioned earlier, the first estimator 60 may include the single state Estimator 64 to provide an external reactance $X_E$ as output (e.g., state estimate). The first estimator 60 may also include the infinite bus calculation system 62, which may take measurements gathered at block 202 to derive voltage and/or frequency for the infinite bus 58. The process 200 may then use a switching logic (block 206) included in the second estimation 68 to determine a model to use. The model to use may be a multi-state model such an Extended Kalman filter model.

During startup of the power generation system 10, the first model to be used may be the first model 112. The first model 112 may be an Extended Kalman filtering modeling the generator 14 via Equations 1 and 2 above. The process 200 may then derive (block 208) outputs for the second estimator 68. Outputs for the second estimator 68 may include certain generator 14 (e.g., synchronous machine) internal states, such as δ, an angle between EMF and the reference voltage vector; co, generator 14 speed (e.g., RPM); E', generator 14 internal voltage; and ψk, flux in the generator 14; external reactance $X_E$; power in watts for the generator 14; current of the generator 14; and/or voltage of the generator 14. The process 200 may then apply (block 210) the outputs of the first and/or second estimators 60, 68 for stabilization. The adaptive PSS 50, for example, may use the AVR 52 to inject voltages, current, and so forth, based on the outputs of the firsts and/or second estimators 60, 68. In this manner, a more efficient and adaptive power generation system 10 may be provided.

Technical effects of the disclosed embodiments include a power generation system having an adaptive power system stabilizer (PSS). The adaptive PSS may use a cascaded set of estimators, where outputs of a first estimator are then used as inputs to a second estimator. In certain embodiments, the first estimator may include a single state Kalman filter and an infinite bus calculation system. The single state estimator may be used to derive an external reactance $X_E$ and values for an infinite bus. The external reactance $X_E$, the values for the infinite bus, and variables of the first estimator may be used by the second estimator. The second estimator may include switching logic that switches between various models. Each subsequent model may include the previous model plus an extra state variable. The switching logic may be time based or error threshold based. By using a cascaded model system with switchable models, the techniques described herein may provide for a more accurate and adaptive PSS that enhances stability for the power generation system.

The subject matter described in detail above may be defined by one or more clauses, as set forth below.

A power generation system includes an adaptive power system stabilizer (PSS). The adaptive PSS includes a first estimator configured to receive a plurality of sensor measurements as input and to output a derived infinite bus (TB) value. The adaptive PSS further includes a second estimator disposed downstream of the first estimator and configured to receive the derived IB value as input and to output a derived electric generator parameter, wherein the adaptive PSS is configured to use the derived electric generator parameter to provide stabilization of an electric generator.

The system of any preceding clause, wherein the first estimator comprises a single state estimator configured to derive a first external reactance $X_E$ and the derived IB value, wherein the second estimator is configured to use the first external reactance $X_E$. and the derived IB value as inputs and to derive a set of outputs including at least one of generator states or a second external reactance $X_E$, and wherein the adaptive PSS is configured to use the set of outputs to provide stabilization of the electric generator.

The system of any preceding clause, wherein the plurality of sensor measurements comprises a plurality of electric generator measurements and wherein the single state estimator is configured to use the plurality of electric generator measurements to derive the first external reactance $X_E$.

The system of any preceding clause, wherein the plurality of electric generator measurements comprises a generator stator current Ist, a generator stator voltage Ust, a phase angle φ between stator voltage and stator current, or a combination thereof.

The system of any preceding clause, wherein the single state estimator comprises a single state Kalman filter configured to use a relationship $Ist^2 \cdot X_E^2 + 2 \cdot Ust \cdot Ist \cdot \sin \varphi \cdot X_E + Ust^2 - IB^2 = 0$ to solve for the first external reactance $X_E$, and wherein the IB in the relationship comprises a voltage value.

The system of any preceding clause, wherein the second estimator comprises a model that models internal states of the electric generator, the internal states comprising an angle δ between a generator electromagnetic field (EMF) and a reference voltage vector; an electric generator speed ω; an electric generator internal voltage E', a flux ψk in the electric generator, or a combination thereof.

The system of any preceding clause, wherein the adaptive PSS is configured to use the derived electric generator parameter to provide stabilization of the electric generator.

The system of any preceding clause, wherein the adaptive PSS is included in an excitation system, and wherein the excitation system is configured to create an electric field via an exciter to operate the electric generator at a desired output voltage, power factor, frequency, or a combination thereof.

The system of any preceding clause, wherein the electric generator is mechanically coupled to a turbine configured to provide rotative power to the electric generator.

A method includes procuring, via a sensor network, a plurality of sensor measurements, and deriving, via a first estimator, an infinite bus (IB) value; wherein the first estimator is configured to use the plurality of sensor measurements as input to output the IB value. The method further includes deriving, via a second estimator disposed downstream of the first estimator, a derived electric generator parameter, wherein the second estimator is configured to use the IB value and the plurality of sensor measurements as inputs to output the derived electric generator parameter. The method also includes stabilizing an electric generator via an adaptive power system stabilizer (PSS) based on the derived electric generator parameter.

The method of any preceding clause, wherein the first-estimator comprises a single state estimator configured to derive a first external reactance $X_E$, and the IB value wherein the second estimator is configured to use the first external reactance $X_E$. and the IB value as inputs and to derive a set of outputs including at least one of generator states or a second external reactance $X_E$, and wherein the adaptive PSS is configured to use the set of outputs to provide stabilization of the electric generator.

The method of any preceding clause, wherein the plurality of sensor measurements comprises a plurality of electric generator measurements and wherein the single state estimator is configured to use the plurality of electric generator measurements to derive the first external reactance $X_E$.

The method of any preceding clause, wherein the plurality of electric generator measurements comprises a generator stator current Ist, a generator stator voltage Ust, a phase angle φ between stator voltage and stator current, or a combination thereof.

The method of any preceding clause, wherein the single state estimator comprises a single state Kalman filter configured to use a relationship $Ist^2 \cdot X_E^2 + 2 \cdot Ust \cdot Ist \cdot \sin \varphi \cdot X_E + Ust^2 - IB^2 = 0$ to solve for the first external reactance $X_E$, and wherein the IB in the relationship comprises a voltage value.

The method of any preceding clause, wherein the second estimator comprises a model that models internal states of the electric generator, the internal states comprising an angle δ between a generator electromagnetic field (EMF) and a reference voltage vector; an electric generator speed ω; an electric generator internal voltage E', a flux ψk in the electric generator, or a combination thereof.

A non-transitory computer-readable medium having computer executable code stored thereon, the code includes instructions to procure, via a sensor network, a plurality of sensor measurements, and to derive, via a first estimator, an infinite bus (TB) value; wherein the first estimator is configured to use the plurality of sensor measurements as input to output the IB value. The code also includes instructions to derive, via a second estimator disposed downstream of the first estimator, a derived electric generator parameter, wherein the second estimator is configured to use the IB value as input to output the derived electric generator parameter. The code further includes instructions to stabilize an electric generator via an adaptive power system stabilizer (PSS) based on the derived electric generator parameter.

The non-transitory computer-readable medium of any preceding clause, wherein the first estimator comprises a single state estimator configured to derive a first external reactance $X_E$ and the IB value, wherein the second estimator is configured to use the first external reactance $X_E$. and the IB value as inputs and to derive a set of outputs including at least one of generator states or a second external reactance $X_E$, and wherein the adaptive PSS is configured to use the set of outputs to provide stabilization of the electric generator.

The non-transitory computer-readable medium of any preceding clause, wherein the plurality of sensor measurements comprises a generator stator current Ist, a generator stator voltage Ust, a phase angle φ between stator voltage and stator current, or a combination thereof.

The non-transitory computer-readable medium of any preceding clause, wherein the single state estimator comprises a single state Kalman filter configured to use a relationship $1st^2 \cdot X_E^2 + 2 \cdot Ust \cdot 1st \cdot \sin \varphi \cdot X_E + Ust^2 - IB^2 = 0$ to solve for the first external reactance $X_E$, and wherein the IB in the relationship comprises a voltage value.

The non-transitory computer-readable medium of any preceding clause, wherein the second estimator comprises a model that models internal states of the electric generator, the internal states comprising an angle δ between a generator electromagnetic field (EMF) and a reference voltage vector; an electric generator speed ω; an electric generator internal voltage E', a flux ψk in the electric generator, or a combination thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A power generation system, comprising:
  an adaptive power system stabilizer (PSS), comprising:
    a first estimator configured to receive a plurality of sensor measurements as input and to output a derived infinite bus (IB) value; and
    a second estimator disposed downstream of the first estimator and configured to receive the derived IB value as input and to output a derived electric generator parameter, wherein the adaptive PSS is configured to use the derived electric generator parameter to provide stabilization of an electric generator,
      wherein the second estimator comprises a model that models internal states of the electric generator, the internal states comprising an angle δ between a generator electromagnetic field (EMF) and a reference voltage vector, an electric generator speed ω, an electric generator internal voltage E', a flux ψk in the electric generator, or a combination thereof,
      wherein the adaptive PSS is included in an excitation system, and wherein the excitation system is configured to create an electric field via an exciter to operate the electric generator at a desired output voltage, power factor, frequency, or a combination thereof,
      wherein the electric generator is configured to mechanically couple to a turbine configured to provide rotative power to the electric generator.

2. The power generation system of claim 1, wherein the first estimator comprises a single stage estimator configured to derive a first external reactance $X_E$ and the derived IB value, wherein the second estimator is configured to use the first external reactance $X_E$ and the derived IB value as inputs and to derive a set of outputs including at least one of generator states or a second external reactance $X_E$, and wherein the adaptive PSS is configured to use the set of outputs to provide stabilization of the electric generator.

3. The power generation system of claim 2, wherein the plurality of sensor measurements comprises a plurality of electric generator measurements and wherein the single state estimator is configured to use the plurality of electric generator measurements to derive the first external reactance $X_E$.

4. The power generation system of claim 3, wherein the plurality of electric generator measurements comprises a generator stator current 1st, a generator stator voltage Ust, a phase angle φ between stator voltage and stator current, or a combination thereof.

5. The power generation system of claim 4, wherein the single state estimator comprises a single state Kalman filter configured to use a relationship $1st^2 \cdot X_E^2 + 2 \cdot Ust \cdot 1st \cdot \sin \varphi \cdot X_E + Ust^2 - IB^2 = 0$ to solve for the first external reactance $X_E$, and wherein the IB in the relationship comprises a voltage value.

6. The power generation system of claim 1, wherein the internal states comprise each of the angle δ between the generator electromagnetic field (EMF) and the reference voltage vector, the electric generator speed ω, the electric generator internal voltage E', and the flux ψk in the electric generator.

7. The power generation system of claim 1, comprising the electric generator coupled to the adaptive PSS.

8. The power generation system of claim 7, comprising the turbine mechanically coupled to the electric generator.

9. The power generation system of claim 8, wherein the turbine comprises a gas turbine.

10. A method, comprising:
  procuring, via a sensor network, a plurality of sensor measurements;
  deriving, via a first estimator, an infinite bus (IB) value; wherein the first estimator is configured to use the plurality of sensor measurements as input to output the IB value;
  deriving, via a second estimator disposed downstream of the first estimator, a derived electric generator parameter, wherein the second estimator is configured to use the IB value and the plurality of sensor measurements as inputs to output the derived electric generator parameter, wherein the second estimator comprises a model that models internal states of an electric generator, the internal states comprising an angle δ between a generator electromagnetic field (EMF) and a reference voltage vector, an electric generator speed ω, an electric generator internal voltage E', a flux ψk in the electric generator, or a combination thereof; and
  stabilizing the electric generator via an adaptive power system stabilizer (PSS) based on the derived electric generator parameter, wherein the adaptive PSS is included in an excitation system, and wherein the excitation system is configured to create an electric field via an exciter to operate the electric generator at a desired output voltage, power factor, frequency, or a combination thereof, wherein the electric generator is configured to mechanically couple to a turbine configured to provide rotative power to the electric generator.

11. The method of claim 10, wherein the first estimator comprises a single state estimator configured to derive a first external reactance $X_E$ and the IB value, wherein the second estimator is configured to use the first external reactance $X_E$ and the IB value as inputs and to derive a set of outputs including at least one of generator states or a second external reactance $X_E$, and wherein the adaptive PSS is configured to use the set of outputs to provide stabilization of the electric generator.

12. The method of claim 11, wherein the plurality of sensor measurements comprises a plurality of electric generator measurements and wherein the single state estimator is configured to use the plurality of electric generator measurements to derive the first external reactance $X_E$.

13. The method of claim 12, wherein the plurality of electric generator measurements comprises a generator stator current Ist, a generator stator voltage Ust, a phase angle φ between stator voltage and stator current, or a combination thereof.

14. The method of claim 13, wherein the single state estimator comprises a single state Kalman filter configured to use a relationship $Ist^2 \cdot X_E^2 + 2 \cdot Ust \cdot Ist \cdot \sin\varphi \cdot X_E + Ust^2 - IB^2 = 0$ to solve for the first external reactance $X_E$, and wherein the IB in the relationship comprises a voltage value.

15. The method of claim 10, wherein the internal states comprise each of the angle δ between the generator electromagnetic field (EMF) and the reference voltage vector, the electric generator speed ω, the electric generator internal voltage E', and the flux ψk in the electric generator.

16. A non-transitory computer-readable medium having computer executable code stored thereon, the code comprising instructions to:
procure, via a sensor network, a plurality of sensor measurements;
derive, via a first estimator, an infinite bus (IB) value; wherein the first estimator is configured to use the plurality of sensor measurements as input to output the IB value;
derive, via a second estimator disposed downstream of the first estimator, a derived electric generator parameter, wherein the second estimator is configured to use the IB value as input to output the derived electric generator parameter, wherein the second estimator comprises a model that models internal states of an electric generator, the internal states comprising an angle δ between a generator electromagnetic field (EMF) and a reference voltage vector, an electric generator speed ω, an electric generator internal voltage E', a flux ψk in the electric generator, or a combination thereof; and
stabilize the electric generator via an adaptive power system stabilizer (PSS) based on the derived electric generator parameter, wherein the adaptive PSS is included in an excitation system, and wherein the excitation system is configured to create an electric field via an exciter to operate the electric generator at a desired output voltage, power factor, frequency, or a combination thereof, wherein the electric generator is configured to mechanically couple to a turbine configured to provide rotative power to the electric generator.

17. The non-transitory computer-readable medium of claim 16, wherein the first estimator comprises a single state estimator configured to derive a first external reactance $X_E$ and the IB value, wherein the second estimator is configured to use the first external reactance $X_E$ and the IB value as inputs and to derive a set of outputs including at least one of generator states or a second external reactance $X_E$, and wherein the adaptive PSS is configured to use the set of outputs to provide stabilization of the electric generator.

18. The non-transitory computer-readable medium of claim 17, wherein the plurality of sensor measurements comprises a generator stator current Ist, a generator stator voltage Ust, a phase angle φ between stator voltage and stator current, or a combination thereof.

19. The non-transitory computer-readable medium of claim 18, wherein the single state estimator comprises a single state Kalman filter configured to use a relationship $Ist^2 \cdot X_E^2 + 2 \cdot Ust \cdot Ist \cdot \sin\varphi \cdot X_E + Ust^2 - IB^2 = 0$ to solve for the first external reactance $X_E$, and wherein the IB in the relationship comprises a voltage value.

20. The non-transitory computer-readable medium of claim 16, wherein the internal states comprise each of the angle δ between the generator electromagnetic field (EMF) and the reference voltage vector, the electric generator speed ω, the electric generator internal voltage E', and the flux ψk in the electric generator.

* * * * *